Patented Dec. 10, 1935

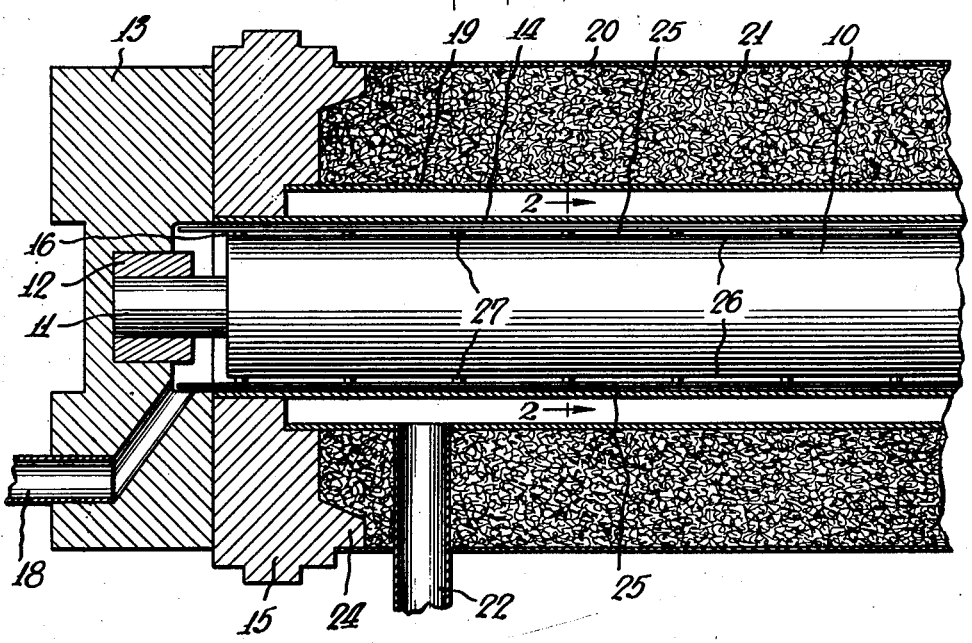
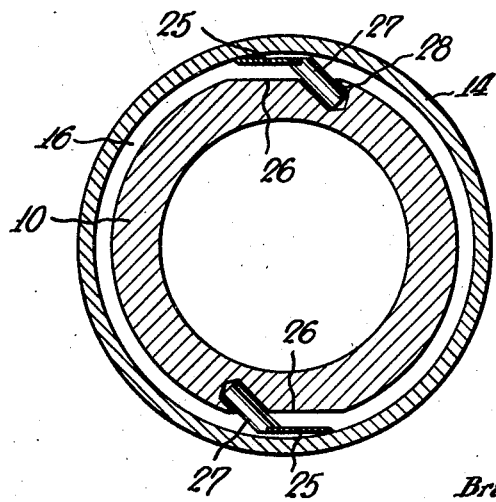

2,023,607

UNITED STATES PATENT OFFICE 2,023,607

PROCESSING APPARATUS

Bruce De Haven Miller, Louisville, Ky., assignor to Vogt Processes, Incorporated, Louisville, Ky., a corporation of Delaware Application November 3, 1934, Serial No. 751,294

9 Claims. (Cl. 259—9)

This invention relates to that type of processing apparatus in which the material to be processed is caused to flow in a thin confined layer in contact with a heat transfer surface, and is rapidly and mechanically agitated during such flow. This type of apparatus is disclosed and broadly claimed in the Vogt Patent 1,783,864.

More particularly the invention relates to the type of agitating mechanism disclosed and claimed in the Vogt and Miller Patent No. 1,847,149, in which there is provided a scraper blade carried by a central shaft, the blade and shaft being so formed and disposed with respect to each other as to provide at all times a clearance for the passage of material therebetween at least as great as the clearance between the heat transfer surface and the shaft. The shaft is ordinarily rotated at comparatively high speed, and it has been proposed in the Boileau Patent No. 1,962,386 to so mount the scraping blades that centrifugal force acting on the blades will aid in holding the scraping edges in operative position with the wall of the chamber, and to so mount them that they may be readily separated from the shaft upon the removal of the latter from the chamber.

One object of my invention is so to design the scraper and its blade as to facilitate the formation of a thinner annular space for the processing chamber.

A further object is to retain the desired flexibility and permit the use of a stiffer blade.

A further object is to provide a blade and supports therefor as a one-piece article which may be readily removed from the shaft after the latter has been withdrawn from the chamber, and without the use of any tools or the release or removal of any separate retaining members.

By reason of the novel and important features of my improved construction, the blade will scrape better, will stay sharp longer, and will last longer, and the apparatus may be more quickly assembled or taken apart for cleaning, inspection or repair.

In the specific form illustrated:

Fig. 1 is a central longitudinal section through one portion of an apparatus embodying my invention, and Fig. 2 is a transverse section through the processing chamber, and on a slightly larger scale.

In the specific form shown in the drawing, the hollow shaft 10 which carries the scraper and agitator, is driven at one end in any suitable manner (not shown). A solid trunnion 11 at the other end is mounted in the bearing member 12 carried by the end wall 13 of the processing chamber 16. The outer wall of the chamber is in the form of a cylindrical shell 14 of an internal diameter slightly greater than the external diameter of the shaft 10, the ends of said shell being mounted in walls 15.

The shell 14 serves as a heat transfer surface and annular space between the shell, and the shaft 10 constitutes a chamber through which the material to be processed flows under pressure in a thin confined layer, there being a suitable inlet and an outlet at opposite ends, and one such, 18, being shown.

The shell 14 is encircled by a concentric sleeve or tube 19 of substantially larger internal diameter than the internal diameter of the member 14, and the members 14 and 19 together with end walls 15 cooperatively define an elongated annular chamber through which brine, ammonia or other suitable temperature changing medium may be circulated, there being a suitable inlet and an outlet, one such, 22, being shown.

Encircling the tube or sleeve 19 is a layer of insulation which may be retained in place in any suitable manner, as for instance by a jacket 20.

As thus far described, the construction may be of any suitable character or design, the prior patents above identified disclosing generally similar arrangements of a central shaft and a heat transfer surface defining a thin, confined, elongated, annular processing chamber for the material to be treated, with a suitably insulated annular chamber for the temperature changing medium.

My invention is more particularly concerned with the construction, arrangement and mounting of scraper blades carried by the mutator shaft 10 and serving to remove solidifying material from the inner surface of the sleeve 14 substantially as rapidly as said material solidifies on or adjacent to such surface. The blades 25 which may be of any desired number, are preferably but not necessarily of flexible sheet material, extend lengthwise of the mutator shaft 10, and project beyond the ends of the body portion thereof. Each blade is mounted substantially tangentially to the mutator shaft and the shaft directly under the blade is flattened or cut away at 26 to such an extent as to provide a clearance for the passage of material between the blade and the flattened shaft portion which is as great as the clearance afforded by the remainder of the annular processing chamber, so that the material will not become packed ahead of the blade and interfere with normal operation of the apparatus.

Integrally or otherwise rigidly connected to the trailing edge of the blade, and disposed at an obtuse angle to such blade, are pins or studs 27 arranged at regular intervals along the length thereof, and fitting loosely into sockets 28 formed in the flattened portions 26 of the mutator shaft surface. The sockets extend into the shaft at such an angle that they are substantially tangential to the inner wall of the hollow shaft. The pins fit the sockets sufficiently loosely so that the blade may have a rocking motion about the inner ends of the pins as a fulcrum. This fulcrum, disposed well behind the trailing edge of the blade, will permit the blade to move through a comparatively slight angle of tilting as distinguished from the wider angle of tilt which is possible where the blade pivots are disposed between the leading and trailing edges of the blade as shown for instance in the Boileau patent above referred to.

It will be apparent that with a liquid or substantially liquid material being forced through the processing chamber from end to end thereof, and with the mutator shaft rotating in a counterclockwise direction (Fig. 2), centrifugal force as well as the resistance offered by the material being treated will tend to force the blades against the inner surface of the sleeve 14 and maintain them in proper contact to remove congealing or solidified material from said surface.

The free rocking connection afforded by the studs and sockets permits the blade to accommodate itself automatically to any unevenness in the interior surface of the member 14. At the same time the blade is always pressed by centrifugal force against this surface and maintained relatively sharp by the surface contact because of the very slight angle which the blade forms with said surface. There will be no tendency of the material which is removed to pile up in front of a blade because there is adequate clearance between the blade and the adjacent portion of the shaft. The manner of mounting the blades on the mutator shaft insures flexibility in action even though the blades themselves be relatively rigid.

For purposes of cleaning and repair it is merely necessary to withdraw the shaft 10 from the chamber, and the blades with their supporting studs will automatically drop out of the shaft or may be easily lifted from the shaft. The removal or insertion may be accomplished without the use of any tools. The connection of the blade to the shaft is such that the need for special pivot constructions, special flexible blades, and special blade attaching means is completely eliminated. Furthermore the disposition of the blade pivot at a point well behind its trailing edge permits the annular processing chamber to be even thinner in cross-section than has heretofore been possible, with the result that the ratio of heat transfer surface to the volumetric area of the processing chamber is increased. The material may thus have its temperature changed through a wider range in a shorter period of time than heretofore, resulting in increased efficiency of the processing chamber and the formation of desirable small crystals due to the quicker freezing.

Having thus described my invention, what I claim as new and desire to secure by Letters Patent is:—

1. A processing apparatus including a chamber having a cylindrical enclosing wall, a rotatable body therein, a longitudinally extending scraping blade carried by said body and having a leading edge adapted to be maintained in contact with said wall by centrifugal force as the body is rotated, and a plurality of studs rigid with and at an obtuse angle to the plane of the blade, said body having a plurality of sockets in which said studs are loosely mounted.

2. A processing apparatus including a chamber having a cylindrical enclosing wall, a substantially cylindrical rotatable body therein and of an outside diameter nearly as large as the inside diameter of said enclosing wall, whereby there is formed between said wall and said body a thin, annular, confined space, the outside surface of said body having a substantially flat face, a longitudinally extending scraping blade carried by said body and having a leading edge adapted to be maintained in contact with said wall by centrifugal force as the body is rotated, and a plurality of studs rigid with the blade, said body having a plurality of sockets extending into said face and in which said studs are loosely but removably seated, said studs being disposed at an angle to a longitudinal radial plane of said body and behind the trailing edge of the blade.

3. A processing apparatus having a cylindrical enclosing wall, a central shaft spaced therefrom to form a thin confined annular processing chamber, a longitudinally extending scraping blade carried by said shaft and having a leading edge adapted to be maintained in contact with said wall by centrifugal force as the shaft is rotated, and a plurality of studs rigid with the trailing edge of the blade at an obtuse angle to the plane thereof and mounted in said shaft to tilt in planes at an angle to the axis of said shaft.

4. A processing apparatus having a cylindrical enclosing wall, a central shaft spaced therefrom to form a thin confined annular processing chamber, a longitudinally extending scraping blade carried by said shaft and having a leading edge adapted to be maintained in contact with said wall by centrifugal force as the shaft is rotated, and a plurality of studs rigid with the trailing edge of the blade, disposed at an obtuse angle to the plane of the blade and in planes at an angle to the axis of said shaft, and tiltably mounted in said shaft.

5. A mutator including a pair of concentric relatively rotatable annular walls spaced to form a thin annular wall therebetween, a longitudinally extending scraping blade carried by the inner member and having a leading edge adapted to be maintained in contact with the outer wall by centrifugal force as the inner wall is rotated, a plurality of studs rigid with the blade at the trailing edge of the latter, and disposed at an obtuse angle with respect to the plane of the blade, and a plurality of sockets in the inner member and in which said studs are loosely accommodated, said sockets being disposed in a plane at an angle to a longitudinal radial plane of the inner member, and behind the trailing edge of the blade, said blade being disposed substantially tangential to the inner surface of the outer member.

6. A substantially cylindrical mutator shaft adapted for coaction with an enclosing cylindrical wall, and having a substantially flat face and a blade spaced from said face, substantially parallel thereto, and extending longitudinally thereof, said shaft having a plurality of sockets extending thereinto in directions having a radial component to said shaft and said blade having rigid therewith a plurality of mounting studs loosely fitting said sockets and freely withdrawable from said sockets upon removal of said shaft from said enclosing wall.

7. A scraper adapted for coaction with an enclosing cylindrical wall, and including a rotatable body portion and a blade spaced from the surface of said body portion and extending longitudinally thereof parallel to the axis of the latter, said body portion having a plurality of sockets therein and said blade having a plurality of mounting studs loosely fitting said sockets, said studs connecting with the blade adjacent to the trailing edge of the latter and disposed at an obtuse angle with respect to the blade.

8. An apparatus of the class described, including an elongated thin annular confined processing chamber having an outer cylindrical heat transfer wall and an inner mutator shaft concentrically disposed therein, a scraper blade carried by said shaft, studs on the blade and at an obtuse angle to the plane of the shaft and extending inwardly therefrom towards the axis of said shaft and affording a limited pivotal connection between the shaft and the blade, said means engaging the shaft at points behind the trailing edges of the blade.

9. An apparatus of the class described, including an outer cylindrical heat transfer wall and an inner mutator shaft concentrically disposed and cooperatively defining a thin annular confined procesing chamber, a scraper blade carried by the shaft, means connecting said blade and said shaft and affording a pivotal connection between the shaft and the blade, said means engaging the shaft at points behind the trailing edges of the blade, and comprising studs fixed to the blade, extending inwardly therefrom and loosely seated in sockets in the shaft, whereby the studs and blade may have slight rocking movement in said chamber and may be moved bodily away from said shaft upon the removal of the latter from said chamber.

BRUCE DE HAVEN MILLER.